United States Patent [19]
Scofield

[11] 3,926,000
[45] Dec. 16, 1975

[54] AUTOMOTIVE AIR CONDITIONER AND METHOD OF OPERATING THE SAME

[76] Inventor: Carlie D. Scofield, 31 - 40th St., Gulfport, Miss. 39501

[22] Filed: June 24, 1974

[21] Appl. No.: 482,577

[52] U.S. Cl. .................. 62/121; 62/305; 62/183; 62/243; 62/244; 62/323; 62/184; 62/506; 62/125
[51] Int. Cl.² ............................................ F28C 1/00
[58] Field of Search ............ 62/121, 305, 506, 183, 62/428, 243, 244, 323

[56] References Cited
UNITED STATES PATENTS

| | | | |
|---|---|---|---|
| 2,185,965 | 1/1940 | Newill | 62/183 |
| 2,278,242 | 3/1942 | Chapman | 62/183 |
| 2,297,928 | 10/1942 | Wilson | 62/305 |
| 2,738,651 | 3/1956 | Philipp | 62/243 |
| 2,984,993 | 5/1961 | Carraway | 62/183 |

FOREIGN PATENTS OR APPLICATIONS

| | | | |
|---|---|---|---|
| 722,687 | 1/1932 | France | 62/183 |

Primary Examiner—William J. Wye
Attorney, Agent, or Firm—L. S. Van Landingham, Jr.

[57] ABSTRACT

Automotive air conditioners tend to overheat and also cause the automobile to overheat when it is operated at slow speeds or idled. This problem is overcome by providing an improved automotive air conditioner and method of operating the same wherein the temperature of the air conditioner refrigerant and/or the temperature of the automotive radiator coolant is monitored and when the temperature thereof reaches a predetermined level, liquid water is applied to the heat exchange surfaces of the air conditioner condenser and/or the automotive radiator. The air conditioner condensate may be collected, stored and used when needed as the liquid water to be applied to the condenser and/or radiator. The improved apparatus and novel method of the invention prevent the automotive air conditioning system and the internal combustion engine of the automobile from overheating. The efficiency and cooling capacity of the air conditioner and gas mileage are increased markedly. Lubricating oil breakdown, engine wear and air pollution are reduced very substantially.

23 Claims, 1 Drawing Figure

U.S. Patent  Dec. 16, 1975  3,926,000
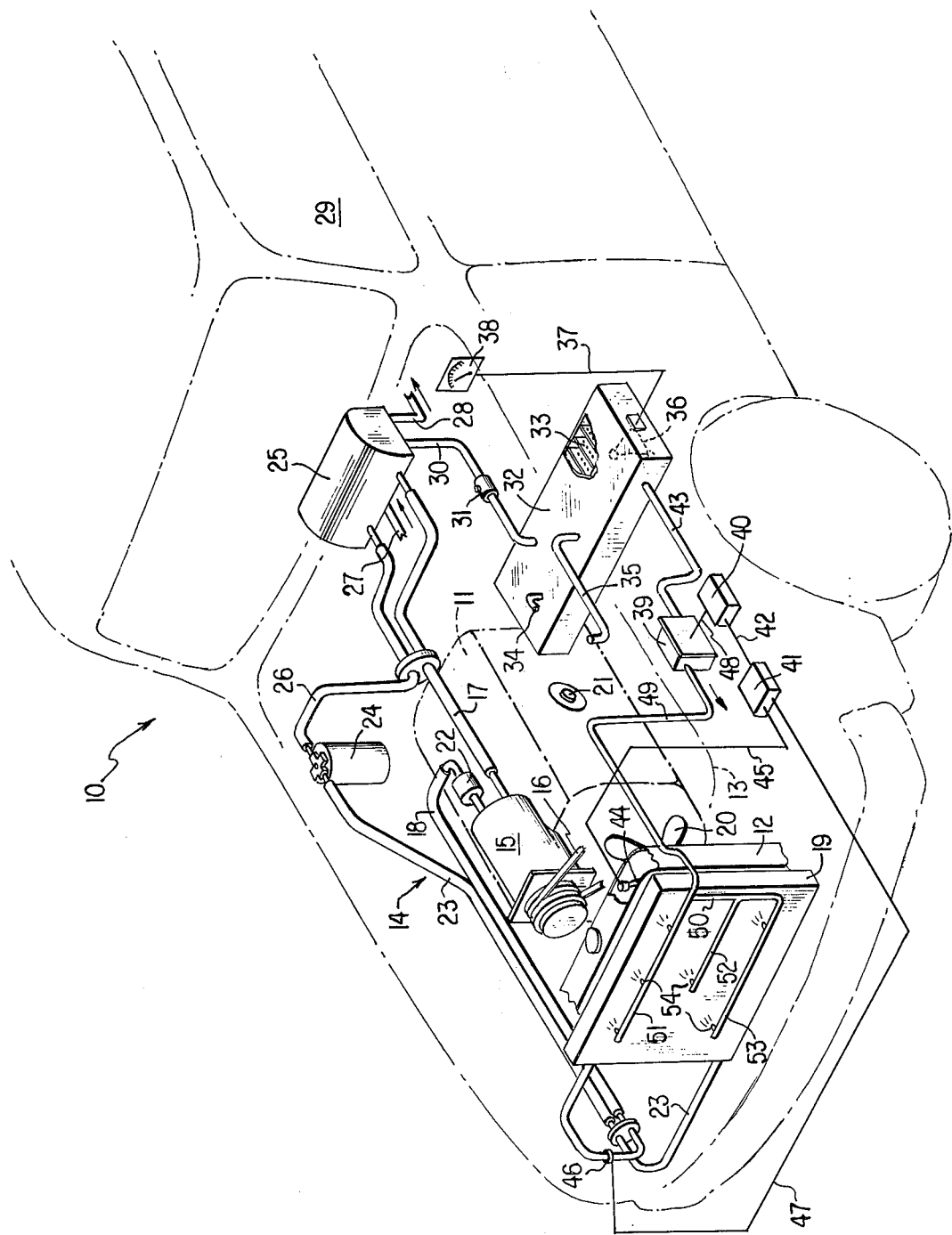

AUTOMOTIVE AIR CONDITIONER AND METHOD OF OPERATING THE SAME

BACKGROUND OF THE INVENTION

This invention relates to an improved automotive air conditioner and a novel method of operating the same. The invention further relates to an apparatus and method for improving the performance of automotive air conditioners and internal combustion engines.

The automotive air conditioning systems presently in use overheat and in turn cause the internal combustion engine of the automobile to overheat when idling or operating at slow speeds. The tendency toward overheating is especially pronounced in extremely hot weather, in heavy in-town traffic, and under other prolonged slow speed operating conditions such as in parades.

The efficiency of the air conditioning system and the cooling capacity thereof are greatly reduced under the aforementioned operating conditions and this has a number of interrelated adverse effects. The compressor operates on a substantially continuous basis in an effort to provide additional cooling capacity. Inasmuch as the compressor is driven by belt connections to the engine and requires a large amount of power when operating, the substantially continuous operation thereof puts an added strain on the engine. Gas mileage is reduced markedly and the increased engine speed and gas consumption tend to cause more heat to be produced at a time when the dissipation of the heat is rendered more difficult due, in part, to the increased operating temperatures of the air conditioner condenser and the automotive radiator. As a result, in many instances, the radiator boils over and all or part of the coolant is lost and the engine must be turned off. In all instances the operating temperature of the engine is increased and lubricating oil breakdown and engine wear proceed at a much faster than normal rate. Smoke and obnoxious gases are produced in greater quantities at the higher engine operating temperature and thus air pollution is difficult to control.

It is apparent from the foregoing discussion that there has been a great and long standing need for an improved automotive air conditioner and an effective method of operating the same whereby the aforemention numerous adverse effects of operating an automobile at prolonged slow speed or idling may be overcome. However, an automotive air conditioning system has not been available prior to the present invention which is capable of overcoming these problems of the prior art in an entirely satisfactory manner.

BRIEF DESCRIPTION OF THE DRAWING

The single FIGURE of the drawing diagramatically illustrates the arrangement of the component elements of the improved automotive air conditioning system of the invention with the front portion of the automobile being shown in phantom line to further aid in illustrating and understanding the invention.

DETAILED DESCRIPTION OF THE INVENTION INCLUDING PREFERRED VARIANTS AND EMBODIMENTS THEREOF

Referring now to the drawing, the standard automobile generally designated as 10 is powered by a prior art internal combustion engine 11 which normally is maintained at a desired operating temperature by the air cooled radiator 12. The radiator 12 is of the usual open prior art construction which allows air to be passed or pulled therethrough. As is well known in this art, a liquid coolant such as water or antifreeze is circulated between the engine 11 and radiator 12. The liquid coolant absorbs the excess heat of combustion of the fuel while flowing within the engine 11, and the absorbed excess heat is dissipated to the atmosphere while the coolant is within the radiator 12. A fan 20 powered by engine 11 is usually positioned behind the radiator 12 for the purpose of pulling ambient air therethrough in the direction of the arrow and thereby aiding in dissipating the excess heat.

The air thus pulled through the radiator 12 thereafter flows rearward and largely forms the ambient atmosphere under hood 13 which surrounds engine 11. The ambient atmosphere thus produced is supplied to the engine 11 via means including a prior art intake 21 and is mixed with fuel which is likewise fed to engine 11 by conventional means (not shown). The resulting mixture of air and fuel is combusted in engine 11 to to produce power for operating the automobile 10 and apparatus associated therewith such as the air conditioning System 14 to be described more fully hereinafter. The combustion of the fuel also produces large amounts of excess heat which must be removed and dissipated to the atmosphere by the radiator 12 as previously described in order to prevent the engine 11 from overheating.

In instances when the radiator 12 is not capable of dissipating the excess heat sufficiently fast to maintain a proper operating temperature, the engine 11 overheats and this causes a number of adverse effects. The lubricating oil breaks down, there is excessive engine wear, and air pollution is increased markedly due to evolution of smoke and obnoxious gases from the exhaust (not shown) of engine 11. The radiator 12 ultimately boils over in instances when the over heating cannot be controlled within acceptable limits. This results in loss of the coolant and the engine must be turned off.

The tendency toward overheating of engine 11 is especially pronounced in hot weather, in heavy in-town traffic, and/or under prolonged idling or slow speed operating conditions. This is due, in part, to the radiator 12 being less efficient in dissipating excess heat under these conditions. The installation of an air conditioning system 14 which is powered by engine 11 further increases the heat load on radiator 12. The air conditioning system 14 causes the engine 11 to operate faster and thereby burn more fuel, and thus more excess heat is produced under given driving conditions.

As a result, the overheating in air-conditioned automobiles of engine 11 in a standard or prior art air conditioned automobiles has been a long standing vexatious problem.

Surprisingly, the aforementioned overheating problems may be solved very efficiently and inexpensively by the improvement described hereinafter. The present invention has a further important beneficial effect in that the composition of the atmosphere under hood 13 is controlled and the resulting mixture of fuel and air which is combusted in engine 11 burns more cleanly and at a lower temperature. Thus, engine 11 produces more power and there is less excess heat to be dissipated by radiator 12.

The air conditioning system 14 may be a standard or prior art automotive air conditioner which has been modified in accordance with the invention. It includes a compressor 15 powered by engine 11 via the usual belt linkage 16. Relatively low pressure refrigerant gas is supplied to compressor 15 via conduit 17, the refrigerant gas is compressed, and relatively high pressure refrigerant gas is withdrawn via conduit 18 and passed to the upper portion of air cooled condenser 19.

A muffler 22 may be provided in conduit 18 to reduce the compressor noise. The condenser 19 is of the usual prior art open construction which allows air to be passed or pulled therethrough and it may be positioned immediately ahead of the radiator 12. This arrangement allows air for cooling purposes to be pulled by fan 20 through both the condenser 19 and the radiator 12.

The high pressure refrigerant gas is liquefied in condenser 19 and liquid refrigerant is withdrawn via conduit 23 and passed to drier 24 where any moisture contained therein is removed by a desiccant such as silica gel. The dry liquid refrigerant is then passed to a prior art evaporator 25 via conduit 26 and evaporated in the coils (not shown) thereof. The refrigerant extracts heat from the evaporator coil in an amount equal to the heat of evaporation and thus the coil is cooled. Moist ambient air is passed via conduit 27 to evaporator 25 and then into intimate contact with the cold evaporator coil. The air is cooled thereby and the cooled air is withdrawn via conduit 28 and passed into the passenger compartment 29. Part of the moisture content of the air supplied via conduit 27 condenses on the evaporator coil and collects in the bottom of evaporator 25. The condensate is withdrawn via a conduit 30 provided with a one way check valve 31 and is passed to water tank 32 where it is collected and stored awaiting use.

The tank 32 is provided with perforated longitudinally extending baffles 33 which prevent undesirable sidewise movement of the water as the automobile 10 is operated. The tank 32 is also provided with an overflow pipe 34 and a fill pipe 35. The water level is determined by a prior art water level indicator 36 which sends an electrical signal via electrical lead 37 to water gauge 38. The gauge 38 may be mounted on the dash of automobile 10 and it indicates the amount of water remaining in tank 32.

The pump 39 is operated by motor 40 through mechanical linkage 48 in response to signals received from controller 41 via electrical 42. The controller 41 produces signals which control the starting and stopping of motor 40, and thus determines when the pump 39 is operated to withdraw water via conduit 43 from tank 32. The controller 41 receives temperature data from at least one component carried by the engine 11 and/or the air conditioning system 14 which varies directly in temperature with an increase in the operating temperature thereof. For example, a stick-type thermostat 44 may be mounted on radiator 12 with the lower temperature sensitive portion thereof immersed in the liquid coolant. The thermostat 44 monitors the temperature of the coolant on a continuous basis and sends an electrical signal to controller 41 via electrical lead 45 when the engine 11 overheats and the temperature exceeds a predetermined level. Alternatively, a strap-type thermostat 46 may be mounted on the surface of conduit 18. The thermostat 46 includes a temperature sensitive element in contact with the surface of conduit 18 which continuously monitors the temperature thereof. The surface temperature of conduit 18 varies directly with the temperature of the compressed gaseous refrigerant flowing therein. Thus, the surface temperature increases with an increase in the temperature of the compressed gaseous refrigerant. When the compressor 15 overheats and the surface temperature of conduit 18 in response to the refrigerant temperature exceeds a predetermined level, then an electrical signal reporting the excessive temperature is sent to controller 41 via electrical lead 47. When the controller 41 receives a signal reporting an excessive temperature, the controller 41 in turn sends a signal to motor 40 via electrical lead 42 and motor 40 commences to drive pump 39. The pump 39 continues to operate so long as thermostats 44 and/or 46 sense a temperature which is above the predetermined level. The pump 39 is stopped when the sensed temperature falls below the predetermined level.

When pump 39 is operating, water is withdrawn from tank 32 via conduit 43 and is pumped via conduit 49 to header 50. The water, which is now under pressure, flows through conduits 51, 52 and 53 and is discharged through nozzles 54 in the form of a fine spray. The nozzles 54 direct the sprayed water onto the condenser 19 where it evaporates and cools the heat exchange surfaces and thereby aids in liquefying the compressed refrigerant gases flowing in conduit 18. The resulting water vapor is pulled through condenser 19 and radiator 12 by fan 20 and moisture is added to the ambient atmosphere surrounding the air intake 21. The water vapor aids in cooling the heat exchange surfaces of radiator 12 as it passes therethrough. The higher moisture content of the air flowing into air intake 21 also causes the fuel admixed therewith to burn cleaner and cooler, and thus engine 11 produces more power and has a lower operating temperature. These beneficial effects of the water vapor tend to prevent engine 11 from overheating.

The air conditioning system 14 is also prevented from overheating. The refrigerant is maintained within the optimum temperature range for the most efficient operation of compressor 15 and condenser 19 due to the added cooling effect of the water spray. The back pressure on compressor 15 is maintained at the level recommended for the most efficient operation thereof and the compressed gases flowing in conduit 18 are easily liquefied in condenser 19 to produce a relatively low temperature stream of liquefied refrigerant flowing in conduit 23 for feeding to evaporator 25. These beneficial effects are derived from maintaining the optimum refrigerant temperature and they allow the compressor 15 to be operated intermittently, as distinguished from continuously. Much less power is required to produce a given amount of refrigeration, and thus engine 11 need not operate as fast and it runs cooler.

Surprisingly, very little water is required to maintain the optimum refrigerant temperature and thereby obtain the marked benefits of the invention. Usually the water is applied to condenser 19 by nozzles 54 at the rate of about 1–10 gallons per hour, and preferably at about 3–7 gallons per hour. The evaporator condensate supplies a substantial amount of the water that is needed, such as about 1.5–2 gallons per hour, and it may be collected in tank 32 during normal driving conditions or when overheating is a problem. Thus, when the water is applied at the rate of 5 gallons per hour and the condensate is collected the net water useage is at the rate of about 3.0–3.5 gallons per hour. When tank 32 has a capacity of 10–20 gallons, the water may be applied for about 3–6 hours and usually this period of time is more than adequate for temporary adverse driving conditions such as heavy in town traffic, during the morning and evening rush hours, or during parades of average length.

It is important to note that the above described rates of water application are only a small percentage of the amount required to cool radiator 12 sufficiently to prevent the overheating of engine 11 when the refrigerant is not maintained at the proper temperature. In such instances, the compressor 15 must run continuously and the back pressure is so high that the power requirements for operating the compressor are far greater than normal. The engine 11 must operate substantially faster to meet the additional power requirements and this markedly increases the danger of overheating.

Any suitable prior art refrigerant may be used in the air conditioning system 14. One of the various Freon refrigerants is usually preferred such as Freon 11, 12, 13, 14, 21, 22, 23, 113, 114, 114-32, 115 or 116. Often Freon 12 (dichlorodifluoromethane) gives the best results in modern automobile air conditioners. Each refrigerant has a preferred temperature of operation which is well known to those skilled in this art. It is understood that the amount of water applied via nozzles 54 is controlled to maintain the preferred temperature for the specific refrigerant that is being used. Also, the thermostats 44 and 46 and the associated controls must be set accordingly to operate pump 39 at the proper time and over the proper period of time to maintain the preferred temperature for the specific refrigerant that is being used. When Freon 12 is the refrigerant, the optimum temperature is about 105°F, and satisfactory results usually may be obtained over a temperature range of about 98°–120°F. These temperatures should exist in the compressor 15 and in the compressed refrigerant gases flowing in conduit 18 to condenser 19.

The thermostats 44 and/or 46 may sense the temperature of any suitable component carried by the engine 11 and/or the compressor system 14 that varies directly in temperature with an increase in the operating temperature thereof. Examples of suitable components carried by the refrigerant system 14 include the compressor 15, the condenser 19, the conduits 18, 23 and 26, and the refrigerant gases or liquids flowing therein. Examples of suitable components carried by the engine 11 include the radiator 12, the engine 11 including its various associated elements such as the transmission, and fluids therein such as the radiator coolant, the lubricating oil, and the transmission oil. The temperature that is monitored in each instance is usually the normal operating temperature or temperature range for the most efficient operation of the given component. For example, the radiator coolant thermostat 44 may be set at about 160°–240°F and preferably at about 180°F.

The foregoing detailed description and the accompanying drawing are for purposes of illustration only, and are not intended to be limiting to the spirit or scope of the appended claims.

I claim:

1. In an automotive vehicle air conditioning system employing a normally gaseous refrigerant which is circulated therein, the air conditioning system being installed in an automotive vehicle powered by an internal combustion engine subject to overheating, the air conditioning system including compressor means driven by the internal combustion engine for compressing the normally gaseous refrigerant to an elevated pressure at which the compressed refrigerant gas liquefies upon being cooled, condenser means including an air cooled heat exchange surface in heat exchange relationship with ambient air for condensing the compressed gaseous refrigerant and thereby producing liquid refrigerant, conduit means for passing the compressed refrigerant from the compressor means to the condenser means, liquid refrigerant evaporator means including a heat exchange surface in heat exchange relationship with relatively moist air whereby the evaporator heat exchange surface is cooled by evaporating liquid refrigerant and the moist air in contact therewith is cooled and liquid water is condensed therefrom on the evaporator heat exchange surface, conduit means for passing liquid refrigerant from the condenser means to the evaporator means, and means for passing gaseous evaporated refrigerant from the evaporator means to the compressor means, the air conditioning system or the internal combustion engine tending to overheat when operated at prolonged idling speeds in hot weather, the improvement in combination therewith comprising providing an internal combustion engine for supplying power for the automotive vehicle which also has an air intake for supplying air for admixing with fuel to be combusted therein, a radiator for cooling the internal combustion engine including an air cooled heat exchange surface and means for transferring air rearwardly over the internal combustion engine including a fan positioned forward of the internal combustion engine, temperature sensing means for sensing the temperature of at least one component carried by the said air conditioning system or the said internal combustion engine which varies directly in temperature with an increase in the operating temperature thereof, the temperature of the said component indicating when the said air conditioning system or the said internal combustion engine is overheating, and means for applying water to the said heat exchange surface of the condenser means, the last named means including means which is rendered operative to apply the water to the heat exchange surface when the temperature of the said component sensed by the temperature sensing means is above a predetermined level and which is rendered inoperative when the temperature of the said component drops below a predetermined level, the said means for applying the water including means for spraying liquid water on the front of the said heat exchange surface of the condenser in an amount effective to prevent the said air conditioning system or the said internal combustion engine from overheating and at the rate of about 1-10 gallons per hour, the said air cooled heat exchange surface of the radiator being positioned between the said heat exchange surface of the condenser and the fan whereby the liquid water sprayed on the front of the heat exchange surface of the condenser passes rearward into intimate contact with the said heat exchange surfaces of the condenser and the radiator in the form of liquid water of water vapor and aids in the cooling thereof, the said means for spraying liquid water also including means for spraying the water at a rate whereby it is evaporated upon passing into intimate contact with the said heat exchange surfaces of the condenser and the radiator and the resulting water vapor is passed rearwardly by the fan into the vicinity of the said air intake whereby the air admixed with the fuel combusted in the internal combustion engine contains a high moisture content which aids in reducing the operating temperature thereof.

2. The apparatus of claim 1 wherein means is provided for collecting the liquid water condensed by the said evaporator and for passing the same to the said means for applying water to the heat exchange surface of the condenser.

3. In a method of operating an automotive air conditioning system employing a normally gaseous refrigerant which is circulated therein, the air conditioning system being installed in an automotive vehicle powered by an internal combustion engine and the air conditioning system or the internal combustion engine tending to overheat when operated at prolonged idling speeds in hot weather, wherein the refrigerant gas is compressed in a compressor driven by the internal combustion engine to an elevated pressure at which the compressed refrigerant gas liquefies upon being cooled, the compressed refrigerant gas is passed to a condenser having an air cooled heat exchange surface and is liquefied therein, the liquefied refrigerant is passed to an evaporator having a heat exchange surface in intimate contact with moist air and is evaporated therein, the heat exchange surface of the evaporator is cooled by evaporating the liquefied refrigerant and the moist air in contact therewith is cooled and liquid water is condensed therefrom, and the refrigerant gas produced by evaporating the liquefied refrigerant is passed to the compressor for recycling in the air conditioning system, the improvement in combination therewith comprising sensing the temperature of at least one component carried by the air conditioning system or the internal combustion engine which varies directly in temperature with an increase in the operating temperature thereof, the sensed temperature of the said component indicating when the said air conditioning system or the said internal combustion engine is overheating, and applying water to the said heat exchange surface of the condenser in response to the said sensed temperature when the sensed temperature of the said component is above a predetermined level, the water being applied in an amount effective to prevent the said air conditioning system or the said internal combustion engine from overheating and at the rate of about 1–10 gallons per hour.

4. The method of claim 3 wherein the water is applied to the heat exchange surface of the condenser at the rate of about 3–7 gallons per hour.

5. The method of claim 3 wherein the water is applied to the heat exchange surface of the condenser at the rate of about 5 gallons per hour.

6. The method of claim 1 wherein the said internal combustion engine is cooled by a radiator having an air cooled heat exchange surface, and the said sprayed liquid water is passed into intimate contact with the heat exchange surfaces of the condenser and the radiator in the form of liquid water or water vapor to aid in the cooling thereof.

7. The method of claim 6 wherein the said internal combustion engine includes an air intake which provides air for admixing with fuel to be combusted therein, and moist air including water vapor resulting from the evaporation of the applied liquid water is passed into the vicinity of the air intake whereby the air admixed with the fuel has a high moisture content.

8. In a method of operating an automotive air conditioning system employing a normally gaseous refrigerant which is circulated therein, the air conditioning system being installed in an automotive vehicle powered by an internal combustion engine and the air conditioning system or the internal combustion engine tending to overheat when operated at prolonged idling speeds in hot weather, wherein the refrigerant gas is compressed in a compressor driven by the internal combustion engine to an elevated pressure at which the compressed refrigerant gas liquefies upon being cooled, the compressed refrigerant gas is passed to a condenser having an air cooled heat exchange surface and is liquefied therein, the liquefied refrigerant is passed to an evaporator having a heat exchange surface in intimate contact with moist air and is evaporated therein, the heat exchange surface of the evaporator is cooled by evaporating the liquefied refrigerant and the moist air in contact therewith is cooled and liquid water is condensed therefrom, and the refrigerant gas produced by evaporating the liquefied refrigerant is passed to the compressor for recycling in the air conditioning system, the improvement in combination therewith comprising sensing the temperature of at least one component carried by the air conditioning system or the internal combustion engine which varies directly in temperature with an increase in the operating temperature thereof, the sensed temperature of the said component indicating when the said air conditioning system or the said internal combustion engine is overheating, and applying water to the said heat exchange surface of the condenser in response to the said sensed temperature when the sensed temperature of the said component is above a predetermined level, and the water being applied by spraying liquid water over the heat exchange surface of the condenser in an amount effective to prevent the said air conditioning system or the said internal combustion engine from overheating.

9. The method of claim 8 wherein the said liquid water is sprayed over the heat exchange surface of the condenser at the rate of about 1–10 gallons per hour.

10. The method of claim 8 wherein the said liquid water is sprayed over the heat exchange surface of the condenser at the rate of about 3–7 gallons per hour.

11. The method of claim 8 wherein the said liquid water is sprayed over the heat exchange surface of the condenser at the rate of about 5 gallons per hour.

12. The method of claim 8 wherein the said internal combustion engine is cooled by a radiator having an air cooled heat exchange surface, and the said sprayed liquid water is passed into intimate contact with the heat exchange surfaces of the condenser and the radiator in the form of liquid water or water vapor to aid in the cooling thereof.

13. The method of claim 12 wherein the said internal combustion engine includes an air intake which provides air for admixing with fuel to be combusted therein, and moist air including water vapor resulting from the evaporation of the applied liquid water is passed into the vicinity of the air intake whereby the air admixed with the fuel has a high moisture content.

14. The method of claim 8 wherein the said liquid water condensed in the evaporator is collected and applied to the heat exchange surface of the condenser.

15. In a method of operating an automotive air conditioning system employing a normally gaseous refrigerant which is circulated therein, the air conditioning system being installed in an automotive vehicle powered by an internal combustion engine and the air conditioning system or the internal combustion engine tending to overheat when operated at prolonged idling speeds in hot weather, wherein the refrigerant gas is compressed in a compressor driven by the internal combustion engine to an elevated pressure at which the compressed refrigerant gas liquefies upon being cooled, the compressed refrigerant gas is passed to a condenser having an air cooled heat exchange surface and is liquefied therein, the liquefied refrigerant is passed to an evaporator having a heat exchange surface in intimate contact with moist air and is evaporated therein, the heat exchange surface of the evaporator is cooled by evaporating the liquefied refrigerant and the moist air in contact therewith is cooled and liquid water is condensed therefrom, and the refrigerant gas produced by evaporating the liquefied refrigerant is passed to the compressor for recycling in the air conditioning system, the improvement in combination therewith comprising sensing the temperature of at least one component carried by the air conditioning system or the internal combustion engine which varies directly in temperature with an increase in the operating temperature thereof, the sensed temperature of the said component indicating when the said air conditioning system or the said internal combustion engine is overheating, collecting the said liquid water condensed in the evaporator, and applying water including the said collected liquid water to the said heat exchange surface of the condenser in response to the said sensed temperature when the sensed temperature of the said component is above a predetermined level, and the water being applied in an amount effective to prevent the said air conditioning system or the said internal combustion engine from overheating.

16. The method of claim 15 wherein the water is applied to the heat exchange surface of the condenser at the rate of about 1–10 gallons per hour.

17. The method of claim 15 wherein the water is applied to the heat exchange surface of the condenser at the rate of about 3–7 gallons per hour.

18. The method of claim 15 wherein the water is applied to the heat exchange surface of the condenser at the rate of about 5 gallons per hour.

19. The method of claim 15 wherein the water is applied by spraying liquid water over the heat exchange surface of the condenser.

20. The method of claim 19 wherein the said internal combustion engine is cooled by a radiator having an air cooled heat exchange surface, and the said sprayed liquid water is passed into intimate contact with the heat exchange surfaces of the condenser and the radiator in the form of liquid water or water vapor to aid in the cooling thereof.

21. The method of claim 20 wherein the said internal combustion engine includes an air intake which provides air for admixing with fuel to be combusted therein, and moist air including water vapor resulting from the evaporation of the applied liquid water is passed into the vicinity of the air intake whereby the air admixed with the fuel has a high moisture content.

22. In an automotive vehicle air conditioning system employing a normally gaseous refrigerant which is circulated therein, the air conditioning system being installed in an automotive vehicle powered by an internal combustion engine subject to overheating, the air conditioning system including compressor means driven by the internal combustion engine for compressing the normally gaseous refrigerant to an elevated pressure at which the compressed refrigerant gas liquefies upon being cooled, condenser means including an air cooled heat exchange surface in heat exchange relationship with ambient air for condensing the compressed gaseous refrigerant and thereby producing liquid refrigerant, conduit means for passing the compressed refrigerant from the compressor means to the condenser means, liquid refrigerant evaporator means including a heat exchange surface in heat exchange relationship with relatively moist air whereby the evaporator heat exchange surface is cooled by evaporating liquid refrigerant and the moist air in contact therewith is cooled and liquid water is condensed therefrom on the evaporator heat exchange surface, conduit means for passing liquid refrigerant from the condenser means to the evaporator means, and means for passing gaseous evaporated refrigerant from the evaporator means to the compressor means, the air conditioning system or the internal combustion engine tending to overheat when operated at prolonged idling speeds in hot weather, the improvement in combination therewith comprising temperature sensing means for sensing the temperature of at least one component carried by the said air conditioning system or the said internal combustion engine which varies directly in temperature with an increase in the operating temperature thereof, the temperature of the said component indicating when the said air conditioning system or the said internal combustion engine is overheating, means for applying water to the said heat exchange surface of the condenser means, the last named means including means which is rendered operative to apply the water to the heat exchange surface when the temperature of the said component sensed by the temperature sensing means is above a predetemined level and which is rendered inoperative when the temperature of the said component drops below a predetermined level, the said means for applying the water being capable of applying water to the heat exchange surface of the condenser in an amount effective to prevent the said air conditioning system or the said internal combustion engine from overheating, and means including a water tank for collecting the liquid water condensed by the said evaporator and for passing the same to the said means for applying water to the heat exchange surface of the condenser, the said water tank having a plurality of longitudinally extending perforated baffles to prevent undue sidewise movement of water contained therein.

23. The apparatus of claim 22 wherein the said water tank is also provided with means for measuring and indicating the amount of water contained therein.

* * * * *